United States Patent [19]

Tye et al.

[11] Patent Number: 4,698,172

[45] Date of Patent: Oct. 6, 1987

[54] AIRCRAFT ANTI-ICING FLUID CONTAINING CARRAGEENAN

[75] Inventors: Richard J. Tye, Wiscasset; George E. Lauterbach, Thomaston; Philip R. Standel, Lamoine, all of Me.

[73] Assignee: FMC Corporation, Philadelphia, Pa.

[21] Appl. No.: 892,980

[22] Filed: Aug. 4, 1986

[51] Int. Cl.$^4$ ............................................. C09K 3/18
[52] U.S. Cl. .................................... 252/70; 106/13
[58] Field of Search ........................... 252/70; 106/13

[56] References Cited

U.S. PATENT DOCUMENTS

| | | | |
|---|---|---|---|
| 2,373,727 | 4/1945 | West et al. | 106/13 |
| 4,291,025 | 9/1981 | Pellico | 424/180 |
| 4,358,389 | 11/1982 | König-Lumer et al. | 252/70 |
| 4,439,337 | 3/1984 | Nimerick et al. | 252/70 |
| 4,501,775 | 2/1985 | Parks et al. | 427/220 |

FOREIGN PATENT DOCUMENTS 3142059  5/1983  Fed. Rep. of Germany ........ 252/70

*Primary Examiner*—Robert A. Wax
*Attorney, Agent, or Firm*—Christopher Egolf

[57] ABSTRACT

An anti-icing fluid suitable for ground treatment of aircraft, being a glycol-based solution containing a gel-forming carrageenan, in an amount of less than 5 wt %. The carrageenan is present in the glycol-based solution in an amount sufficient to thicken the fluid to promote its adherence to aircraft surfaces when applied to a stationary aircraft. Use of this thickened deicing fluid does not adversely affect airfoil lift characteristics during takeoff, because the fluid exhibits shear thinning and readily flows off the aircraft surfaces when exposed to wind shear during the aircraft's takeoff run.

17 Claims, 2 Drawing Figures

AIRCRAFT ANTI-ICING FLUID CONTAINING CARRAGEENAN

BACKGROUND OF THE INVENTION

This invention concerns glycol-based aircraft anti-icing fluids which are thickened with carrageenan, a sulfated polysaccharide gum derived from marine algae.

Aircraft that are either parked on the ground or are on the ground between flights can accumulate snow, ice or frost on the aircraft surfaces in cold winter weather. The presence of such deposits, particularly on airfoil surfaces, is highly undesirable during takeoff and flight since even small accumulations can result in severe deterioration of the airfoil aero-dynamic performance characteristics.

Ethylene glycol has long been used in aqueous solutions of various strengths that are sprayed onto the aircraft, as a deicing agent, to remove snow, ice and frost deposits from aircraft surfaces. After this treatment, the glycol fluid desirably remains as a film coating on the aircraft surfaces, to serve as an anti-icing agent that provides continued antifreeze protection and minimizes the further formation or accretion of snow, ice or frost deposits on the aircraft surfaces. The same glycol-based fluid, in various concentrations, may be used for both deicing and anti-icing functions.

Glycol-based fluids for anti-icing, however, typically contain a thickening agent and desirably possess the following attributes (none of which preclude its use as a deicer):

formation of an essentially continuous film coating, after its application by conventional spraying devices, even on non-horizontal aircraft surfaces extended, long-term protective anti-icing action viscosity and rheology characteristics that promote formation of an effective tenacious protective film coating, yet enable the fluid coating to flow off the aircraft airfoil surfaces during takeoff, prior to aircraft rotation.

U.S. Pat. No. 4,358,389 issued to Konig-Lumer et al. describes a multicomponent glycol-based deicing/anti-icing fluid for treating aircraft, and its formulation is believed to be representative of glycol-based deicing-/anti-icing agents in commercial use:

(a) glycols (40–60%), preferably ethylene glycol, propylene glycol and/or diethylene glycol;

(b) water (35–60%), with glycol and water being at least 94% of formulation;

(c) cross-linked polyacrylate thickener (0.05–1.5%), having a specific viscosity and special flow properties;

(d) mixed-based mineral oil (0.05–1%);

(e) alkylaryl-sulfonate surfactant (0.05–1%);

(f) corrosion inhibitor (0.01–1%); and (g) an alkaline compound like KOH to adjust the pH to 7.5–10.

The patent indicates that other additives, such as anti-oxidants or additional thickeners, can also be present. Polysaccharide gums like xanthan may be used as additional thickeners, since they improve the performance characteristics of the specified polyacrylate thickeners.

The present invention is based on the unexpected discovery that gel-forming carrageenan gum possesses particular efficacy as a thickener for glycol-based aircraft anti-icing fluids.

SUMMARY OF THE INVENTION

In accordance with the present invention, an anti-icing fluid suitable for ground treatment of aircraft is provided which is a glycol-based solution thickened essentially with a gel-forming carrageenan gum, in an amount of less than 5 wt %. The carrageenan is present in the anti-icing fluid in an amount sufficient to thicken the fluid to promote its adherence to aircraft surfaces when applied to a stationary aircraft but also allow for its wind shear-induced removal during the takeoff run prior to rotation.

The anti-icing fluid is preferably an AEA-Type II glycol-based anti-icing fluid, thickened with carrageenan in an amount of less than 5 wt %.

The carrageenan thickener is desirably present in an amount of from about 0.05 to 3 wt %, more preferably from about 0.1 to 1 wt %. The gel-forming carrageenan is preferably iota carrageenan, but kappa carrageenan is also suitable.

The glycol component of the glycol-based fluid is preferably ethylene glycol, either alone or in combination with other glycols like diethylene glycol or propylene glycol. The glycol component of the aqueous anti-icing fluid is desirably present in an amount of at least 40 wt %, preferably from 50–95 wt %.

DETAILED DESCRIPTION

Figure 1:
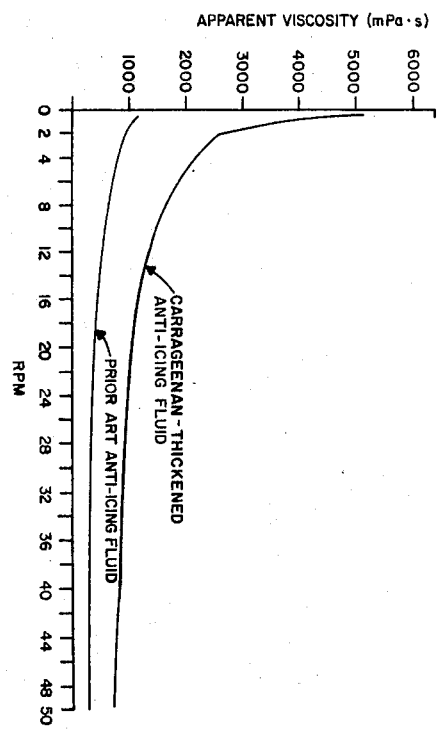
FIG. 1 is a rheogram comparing the apparent viscosities (measured with a Brookfield viscometer), at low shear, of a carrageenan-thickened anti-icing fluid and of a commercially-available prior art anti-icing fluid.

The glycol-based anti-icing fluid of this invention, along with its desirable performance characteristics, may be obtained with most conventional glycol-based fluids via use of the gel-forming carrageenan gum as a fluid thickener. The gel-forming carrageenan is intended for use as the primary thickener in conventional glycol-based anti-icing fluids for aircraft usage. Aircraft anti-icing fluids referred to as Association of European Airlines (AEA) Type II fluids contain a thickener, and carrageenan is especially well suited for use as a thickener in these fluids.

Glycol-based deicing and anti-icing fluids are well known, having been used for aircraft deicing and anti-icing applications for decades. The primary component of the fluid, which provides its deicing and anti-icing properties, is a water-soluble glycol compound. The glycol-based fluids typically contain one or more glycols selected from ethylene glycol, propylene glycol and diethylene glycol. Other glycols or polyols with freezing point depressant properties may also be used, along with the above-noted glycols or in lieu of them.

A preferred fluid formulation contains ethylene glycol as the major glycol component, desirably at least 80% ethylene glycol. Minor amounts of propylene glycol and/or diethylene glycol may also be present in the glycol-based fluid. Diethylene glycol, in combination with propylene glycol, is another glycol formulation that is suitable for use in this invention. The choice and relative amounts of specific glycols present in the glycol-based fluid will depend on the particular anti-icing, antifreeze properties desired for the fluid, e.g., freezing point characteristics, pour point, etc.

The anti-icing fluid is an aqueous solution, i.e., ethylene glycol or other suitable glycol that is diluted with water. The glycol should be present in the aqueous solution in an amount of at least 40 wt %, and preferably is present in an amount of at least 50 wt %, up to about 95 wt %. The combined glycol and water components of the fluid preferably constitute at least 90 wt % of the total composition and more preferably at least about 94 to 95% of the total composition.

The amount of glycol is desirably sufficient to yield a freezing point for the fluid that is less than $-10°$ C. More preferably, the glycol solution is sufficiently concentrated to provide a freezing point that is less than $-30°$ C.

In addition to the gel-forming carrageenan that functions as a thickener for the fluid, the glycol-based fluid may also contain small amounts of other functional ingredients, such as corrosion inhibitors, surfactants, anti-oxidants, stabilizers and the like. These components are ordinarily present in individual amounts of less than 2 wt %, typically in the range of about 0.01–1 wt % for each component.

The gel-forming carrageenan gum used as a thickener in the glycol-based fluids of this invention is responsible for their advantageous properties as air-craft anti-icing fluids. The carrageenan is employed in amounts that effect a significant modification in the rheological properties of the glycol-based fluids. The anti-icing glycol-based fluids of this invention may be best characterized as being thixotropic fluids which possess a yield point; they do not exhibit rheological properties associated with conventional Newtonian fluids.

The thixotropic fluids of this invention, furthermore, should be distinguished from conventionally thickened anti-icing fluids that are merely pseudoplastic systems or systems without a significant yield point. The glycol-based deicing/anti-icing fluid of U.S. Pat. No. 4,358,389, thickened with a crosslinked polyacrylate and optionally xanthan gum, is exemplary of such prior art pseudoplastic fluids.

The thixotropic anti-icing fluids of this invention, having a significant yield point, combine seemingly inconsistent and mutually exclusive properties. When applied to exposed aircraft surfaces, the fluid is sufficiently viscous and/or tacky and has sufficient structure, i.e., gel structure, that it tends to cling or adhere to the surfaces, even non-horizontal surfaces. A coating of sufficient thickness is formed to prevent the adherence or accretion of ice, snow, sleet, frost or the like on such surfaces while the aircraft is stationary or taxiing on the ground. Once the aircraft begins its takeoff run, however, the fluid readily flows off the aircraft surfaces under the influence of wind shear, before lift-off occurs. Consequently, there are no appreciable amounts of fluid present on the aircraft surfaces just prior to lift-off and when the aircraft becomes airborne. This result is highly desirable since a residual layer of anti-icing fluid on the airfoil surfaces, like traces of snow, ice or frost, can adversely affect the lift performance characteristics of the airfoil.

It should be noted that without the presence of the thickener employed in this invention, the aqueous glycol fluid would exhibit relatively low viscosity and would tend to drain off any non-horizontal surfaces under the influence of gravity, leaving an insufficient film behind to function effectively as an anti-icing agent over an extended period of time.

The gel-forming carrageenan gum thickener is employed in this invention in an amount that increases the apparent viscosity and/or tackiness of the glycol-based fluid and, moreover, gives it a physical structure known as a gel under zero shear or very low shear conditions.

The amount of carrageenan thickener in the aqueous glycol-based fluid should be less than 5 wt %, based on the weight of the fluid. The amount of thickener is preferably within the range of 0.05–3 wt %, and more preferably within the range of from 0.1–1 wt %.

When the glycol-based fluid containing these amounts of carrageenan thickener is applied to the exposed surfaces of a stationary aircraft, the gravity-induced flow of the fluid coating from non-horizontal surfaces (i.e., inclined, vertical, or the like) is greatly retarded or stopped for appreciable periods of time.

The thickened anti-icing fluid produces a coating, when applied to aircraft surfaces by conventional methods, that imparts anti-icing or antifreeze characteristics to the treated aircraft surface and minimizes the adherence or accretion of ice, snow, sleet, etc. on or to the exposed aircraft surfaces. This protection continues to be effective over holdover periods of several hours, eight hours or more, without the need for repeated application treatments.

The apparent viscosity produced by the carrageenan thickener in the glycol-based fluids of this invention is desirably in the range of about 1,000–10,000 mPa.s, preferably 2,000–8,000 mPa.s, as measured with a Brookfield RVT viscometer at 0.5 rpm and $1°\pm1°$ C. using a #2 spindle.

Once the aircraft begins it takeoff run, but prior to rotation and lift-off, the impact of the relative wind on the airfoils and other exposed surfaces treated with anti-icing fluid causes sufficient shear force on the thixotropic fluid of this invention to stress it beyond its yield point. Beyond its yield point, the fluid exhibits significant shear-induced thinning and behaves like a relatively non-viscous material. It is then readily blown off the airfoils and other treated aircraft surfaces.

During the aircraft's takeoff run and prior to rotation (the point at which airfoil lift is sufficient for the pilot to effect lift-off and fly the aircraft off the ground), the wind shear from the relative wind changes the rheological behavior of the fluid of this invention, causing substantial shear thinning and an appreciable decrease in its apparent viscosity that allows it to flow freely off the airfoil surfaces. The airfoil surfaces are thus not only kept free of any adhering i.e., snow or the like, but also free of any traces of thickened fluid, both of which could have a deleterious effect on the airfoil lift performance.

The carrageenan gum employed in the thickened glycol-based fluid of this invention is a gel-forming type of carrageenan. Iota and kappa carrageenans are the two most significant gel-forming carrageenans; iota carrageenan is preferred. These may be used individually or as mixtures.

The gel-forming carrageenan preferably contains a substantial proportion of sodium iota carrageenan, whose hydration characteristics, yield point and thixotropy, and rheological shear thinning makes it preferred for use in aqueous glycol systems. Kappa carrageenan exhibits increased yield points but somewhat lower shear thinning than iota carrageenan. Sodium carrageenan is preferred, especially for the iota carrageenan, but calcium and potassium carrageenans are also suitable.

The gel-forming carrageenan thickeners of this invention may also include other components as well. Carrageenan such as lambda carrageenan, while not gel-forming, can be added to gel-forming carrageenans to modify the rheological, shear-thinning properties provided by the primary carrageenan component. Materials such as locust bean gum or cassia gum can likewise be added because of their synergistic interaction with carrageenan in enhancing the gelation properties.

The gel-forming carrageenan gum is used as the primary thickener in the anti-icing fluid of this invention. As noted above, however, minor amounts of other ingredients may also be present to provide additional thickening or gelling functionality or modify rheological behavior. The carrageenan used as the essential thickening component desirably represents at least 80 wt % of the thickening components present; preferably, it represents in excess of 90 wt % of the thickener employed.

Other polysaccharide gums could be substituted for the gel-forming carrageenan thickeners in this invention, with satisfactory results. Such polysaccharides, like carrageenan, must produce an increase in apparent viscosity of the thickened aqueous glycol-based fluid at relatively low use levels and possess a yield point, and they must exhibit the required shear thinning characteristics of a pseudoplastic fluid which possesses a yield point. One such thickener is agar/agarose, and other suitable gum substitutes for carrageenan should be readily apparent to one skilled in the art.

The gel-forming carrageenan gums employed as thickeners in this invention exhibit the desired shear thinning characteristics described above, yet are resistant to pump shear-induced degradation. This particular characteristic is important since anti-icing fluids are typically applied using conventional ground-based deicing equipment which incorporates a pump driven spraying system. The carrageenan-thickened aqueous glycol-based anti-icing fluids of this invention exhibit sufficient shear thinning to be readily pumpable in conventional aircraft ground deicing equipment.

The aqueous glycol-based fluids of this invention are primarily intended for use as anti-icing fluids for treating stationary aircraft but may also be used for general deicing purposes as well. The fluid may also be employed in other similar anti-icing/deicing applications as well, e.g., treating automobile or vehicle windshields and other exposed surfaces.

The following example is illustrative of the aqueous glycol-based fluids of this invention.

EXAMPLE

An anti-icing agent useful for deicing and anti-icing aircraft is prepared as follows, using ethylene glycol as the glycol component and carrageenan as the thickener and having the following composition: 49.875 wt % ethylene glycol, 49.875 wt % water and 0.25 wt % iota carrageenan.

The carrageenan employed is Gelcarin® GP 379 carrageenan, a calcium iota carrageenan available from FMC Corporation's Marine Colloids Division (Philadelphia, Pa 19103). The carrageenan is a dry powder that is off-white in appearance.

The requisite carrageenan is introduced into a small amount of ethylene glycol at room temperature, with vigorous agitation, to disperse the carrageenan into the glycol and form a carrageenan-glycol slurry containing from 10-30% solids. The carrageenan is very hydrophilic and tends to lump when added to an aqueous medium, so the preferred procedure involves first dispersing the carrageenan into the glycol.

The carrageenan-glycol dispersion is then added, with agitation, to a substantial portion of the required water and heated to a moderately high temperature, at least 50° C. and preferably 85° C., to dissolve the carrageenan into solution. The aqueous solution containing carrageenan and a small amount of glycol may then be cooled but this is not essential. The solution is next mixed with the balance of required ethylene glycol and sufficient water to yield an aqueous glycol-based solution containing 0.25 wt % carrageenan and equal proportions of glycol and water.

This aqueous glycol-based fluid has a freezing point of below −30° C. Other physical characteristics of the carrageenan-thickened fluid were measured to evaluate its usefulness as an anti-icing fluid for treating ground-based aircraft.

To provide a basis for comparison, a commercially-available anti-icing/deicing fluid, Hoechst 1704 Aircraft Deicer Fluid available from Hoechst AG (D-8261 Gendorf, Federal Republic of Germany) was also evaluated under the same conditions. The Hoechst 1704 deicer fluid is a glycol-based aqueous fluid, containing about 55 wt % glycol and a thickener, qualifying it as an AEA (Association of European Airlines) Type II fluid.

The apparent viscosity and shear thinning characteristics were evaluated for the carrageenan-thickened fluid of this invention and for the Hoechst 1704 deicing fluid.

First, the apparent viscosities of the two fluids were measured under low shear conditions using a Brookfield RVT viscometer, at a temperature of 1° C.±1° C., using a #2 spindle rotated at increasing rates up to 50 rpm. Results are shown in FIG. 1, in which apparent viscosity (mPa.s) is plotted as a function of the viscometer RPM in the rheogram.

The upper curve in FIG. 1, for the carrageenan-thickened fluid, illustrates the significantly higher apparent viscosity for the fluid of this invention under low shear conditions, compared to a prior art commercial deicing fluid. Especially noteworthy is the dramatic increase in apparent viscosity below 2 rpm, i.e., at very low or no shear, for the carrageenan-thickened fluid. The inflection in the upper curve occurring at about 2 rpm suggests the transition to a gel-like structure for this fluid; below this point (at 2 rpm or less), gel-formation appears to cause the appreciable increase in apparent viscosity. This characteristic is highly desirable in an anti-icing fluid since it causes the thickened fluid to remain adhered to the aircraft surfaces under quiescent conditions, such as when the aircraft is parked or taxiing slowly.

Figure 2:
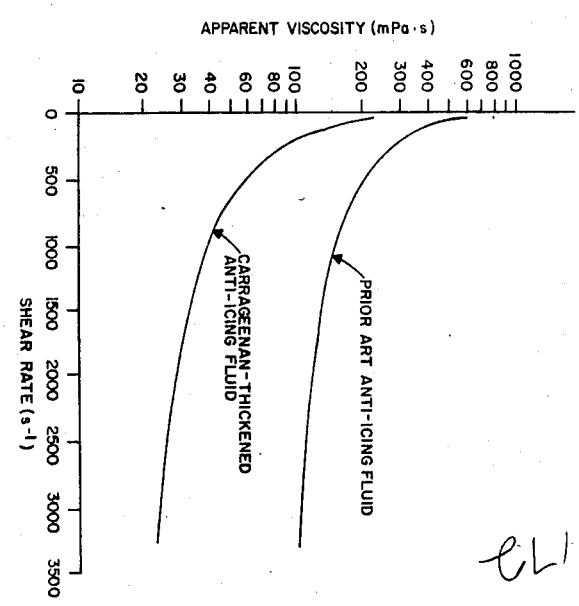
FIG. 2 is a rheogram comparing the apparent viscosities (measured with a Fann viscometer), at moderate shear, of a carrageenan-thickened anti-icing fluid and of a commercially-available prior art anti-icing fluid.

The second evaluation focused on the shear thinning characteristics of the two fluids, which would be evident at higher shear rates such as would be experienced when an aircraft is beginning its takeoff run. A Fann rotating cylinder viscometer was used to generate viscosity data under moderate shear conditions. The results are shown in FIG. 2, a rheogram that plots apparent viscosity (mPa.s) as a function of shear rate $(s^{-1})$. The evaluation on the Fann viscometer, like the Brookfield viscosity measurements, was carried out at a temperature of 1° C.±1° C. The Fann viscometer was fitted with a large bob and small rotor, and the procedure used an acceleration of 0-3254 s$^{-1}$ in two minutes; the system was initialized for a one minute quiescent period from shearing at 3254 s$^{-1}$.

The lower curve in FIG. 2 indicates the significantly greater degree of shear thinning that is exhibited by the carrageenan-thickened fluid, as compared with the Hoechst 1704 deicing fluid. This superior shear thinning, across the entire range of shear rates employed, shows that the carrageenan-thickened fluid of this invention is readily removed from the airfoils and other aircraft surfaces under the influence of relative wind-induced shear during the takeoff run. It should be noted that the upper shear rate shown on FIG. 2, at 3254 s$^{-1}$, corresponds to a wind shear experienced by most large commercial jet aircraft at speeds well below the normal takeoff velocity.

I claim:

1. An anti-icing fluid suitable for ground treatment of aircraft which comprises a glycol-based aqueous solution thickened essentially with gel-forming carrageenan, in an amount of less than 5 wt %.

2. An anti-icing fluid suitable for ground treatment of aircraft which comprises a glycol-based aqueous solution containing gel-forming carrageenan in an amount sufficient to thicken the fluid to promote its adherence to aircraft surfaces when applied to a stationary aircraft but also allow for its wind shear-induced removal during the takeoff run prior to rotation.

3. The composition of claim 1 or 2 wherein the carrageenan is present in an amount of from about 0.05 to 3 wt %.

4. The composition of claim 1 or 2 wherein the carrageenan is present in an amount of from about 0.1 to 1 wt %.

5. The composition of claim 1 or 2 wherein the glycol-based fluid contains one or more carrageenans selected from the group consisting of iota and kappa carrageenan.

6. The composition of claim 5 wherein the carrageenan component includes a substantial proportion of iota carrageenan.

7. The composition of claim 1 or 2 wherein the glycol-based fluid contains one or more glycols selected from the group consisting of ethylene glycol, diethylene glycol and propylene glycol.

8. The composition of claim 7 wherein the glycol component contains a major proportion of ethylene glycol.

9. The composition of claim 7 wherein the glycol component contains at least 80% ethylene glycol.

10. The composition of claim 8 wherein the glycol component contains a major portion of diethylene glycol.

11. The composition of claim 1 or 2 wherein the glycol component of the glycol-based fluid is present in an amount of at least 40 wt %.

12. The composition of claim 11 wherein the glycol component of the glycol-based fluid is present in an amount of from 50-95 wt %.

13. The composition of claim 1 or 2 wherein the glycol component of the glycol-based fluid is present in an amount sufficient to yield a freezing point for the fluid of less than −30° C.

14. The composition of claim 1 or 2 wherein the glycol and water components of the fluid constitute at least 90 wt % of the total composition.

15. The composition of claim 1 or 2 wherein the glycol and water components of the fluid constitute at least 95 wt % of the total composition.

16. The composition of claim 1 or 2 wherein the glycol-based fluid contains a corrosion inhibitor.

17. The composition of claim 1 or 2 wherein the glycol-based fluid contains a surfactant.

* * * * *